(12) United States Patent  
Kicher et al.

(10) Patent No.: US 6,957,588 B1  
(45) Date of Patent: Oct. 25, 2005

(54) FLUID MEASURING DEVICE AND METHOD

(75) Inventors: Thomas P. Kicher, Willoughby Hills, OH (US); Paul T. Kicher, Wickliffe, OH (US)

(73) Assignee: Thomas P. Kicher & Co., Willoughby Hills, OH (US)

( * ) Notice: Subject to any disclaimer, the term of this patent is extended or adjusted under 35 U.S.C. 154(b) by 562 days.

(21) Appl. No.: 09/603,935

(22) Filed: Jun. 27, 2000

Related U.S. Application Data

(60) Provisional application No. 60/141,506, filed on Jun. 28, 1999.

(51) Int. Cl.[7] .................................................. G01F 1/37
(52) U.S. Cl. ........................ 73/861.52; 73/720; 73/726
(58) Field of Search ........................ 73/861.42, 861.52, 73/861.58, 720, 721, 726, 727

(56) References Cited

U.S. PATENT DOCUMENTS

| | | | |
|---|---|---|---|
| 2,897,672 A | 8/1959 | Glasbrenner et al. | |
| 3,341,794 A | 9/1967 | Stedman | |
| 3,538,769 A | 11/1970 | Shiba | |
| 3,563,095 A | 2/1971 | Robinson, Jr. | |
| 4,102,210 A | 7/1978 | Couston et al. | |
| 4,218,926 A | 8/1980 | DeVisser | |
| 4,221,134 A | 9/1980 | Ekstrom, Jr. | |
| 4,261,207 A | 4/1981 | Rockstead et al. | |
| 4,546,649 A | 10/1985 | Kantor | |
| 4,677,859 A | 7/1987 | Chinery | |
| 4,712,430 A | 12/1987 | Wareham | |
| 4,763,527 A | 8/1988 | Raftis | |
| 4,856,347 A | 8/1989 | Johnson | |
| 4,860,594 A | 8/1989 | Hammond et al. | |
| 4,884,452 A | 12/1989 | Kaiser | |
| 4,986,135 A * | 1/1991 | Corser et al. ............. | 73/861.42 |
| 5,044,209 A | 9/1991 | Lew | |
| 5,464,058 A * | 11/1995 | McCoy et al. ......... | 166/250.01 |
| 5,949,118 A * | 9/1999 | Sakai et al. .................. | 73/726 |
| 6,278,811 B1 * | 8/2001 | Hay et al. ..................... | 385/13 |
| 6,354,147 B1 * | 3/2002 | Gysling et al. ............ | 73/61.79 |
| 6,536,291 B1 * | 3/2003 | Gysling et al. .......... | 73/861.42 |

* cited by examiner

*Primary Examiner*—Harshad Patel  
(74) *Attorney, Agent, or Firm*—Renner, Otto, Boisselle & Sklar, LLP

(57) ABSTRACT

A pressure transducer and method for measuring pressure of a fluid flow in a tube include use of a sensing tube through which the pressurized flow passes. The sensing tube deforms outward in response to the pressurized flow within. Deformation measuring devices, such as strain gages, measure the outward deformation and allow computation of the pressure of the flowing fluid. A housing surrounds the sensing tube to relieve stresses on the sensing tube, to prevent damage to the sensing tube, and to contain any rupture of the sensing tube. The sensing tube may have a round, rectangular, or other shape cross-section. The pressure transducer allows continuous and non-invasive measurement of pressure inside a tube. In addition, a flow restriction such as an orifice may be provided in the sensing tube to enable a flow rate to be determined from the pressure drop across the flow restriction. Further, measuring device for measuring flow rate may utilize a sensing tube that bent (strained) because of forces causes by a change of momentum of flowing fluid due to a direction change of the fluid.

67 Claims, 11 Drawing Sheets

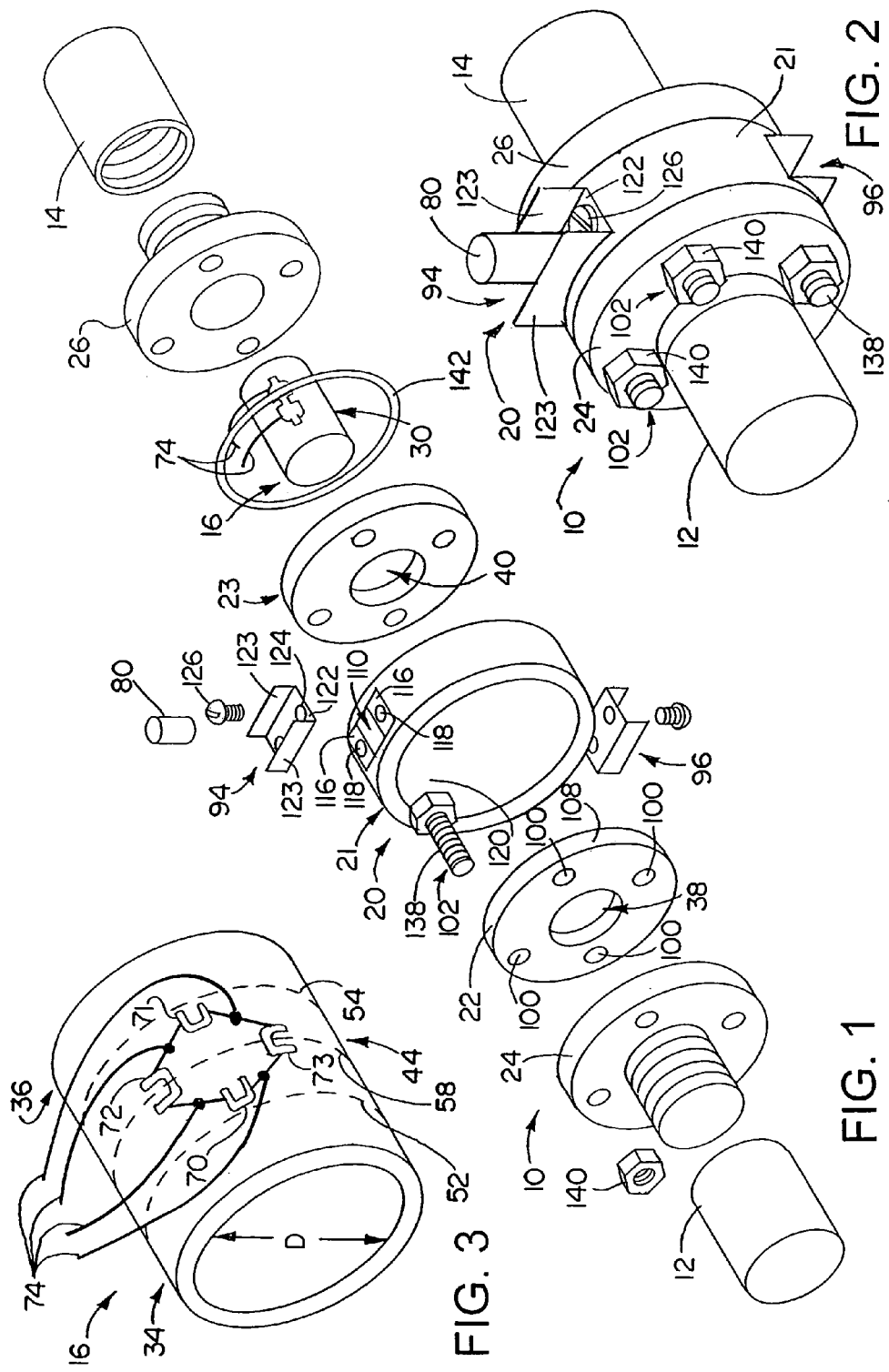

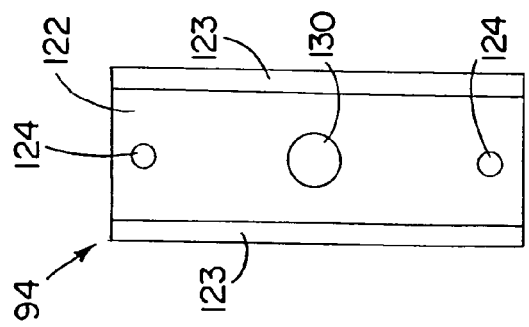
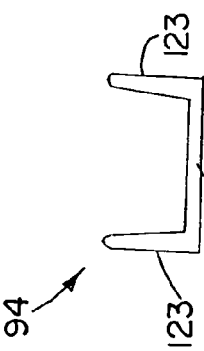
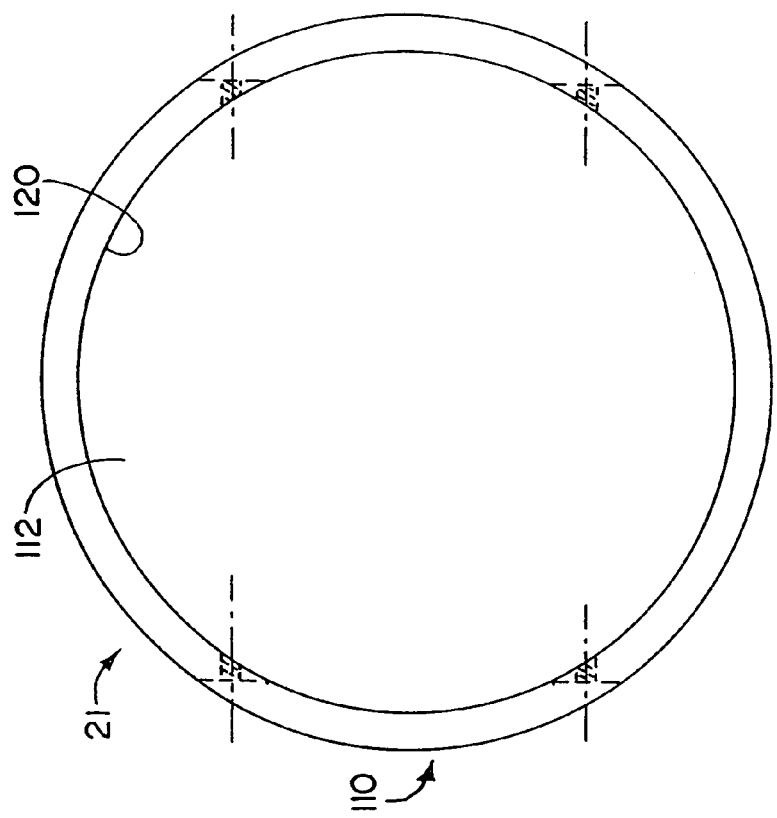
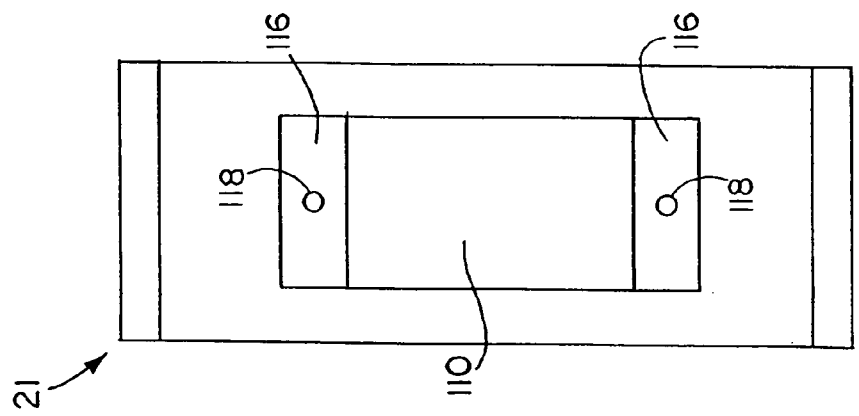

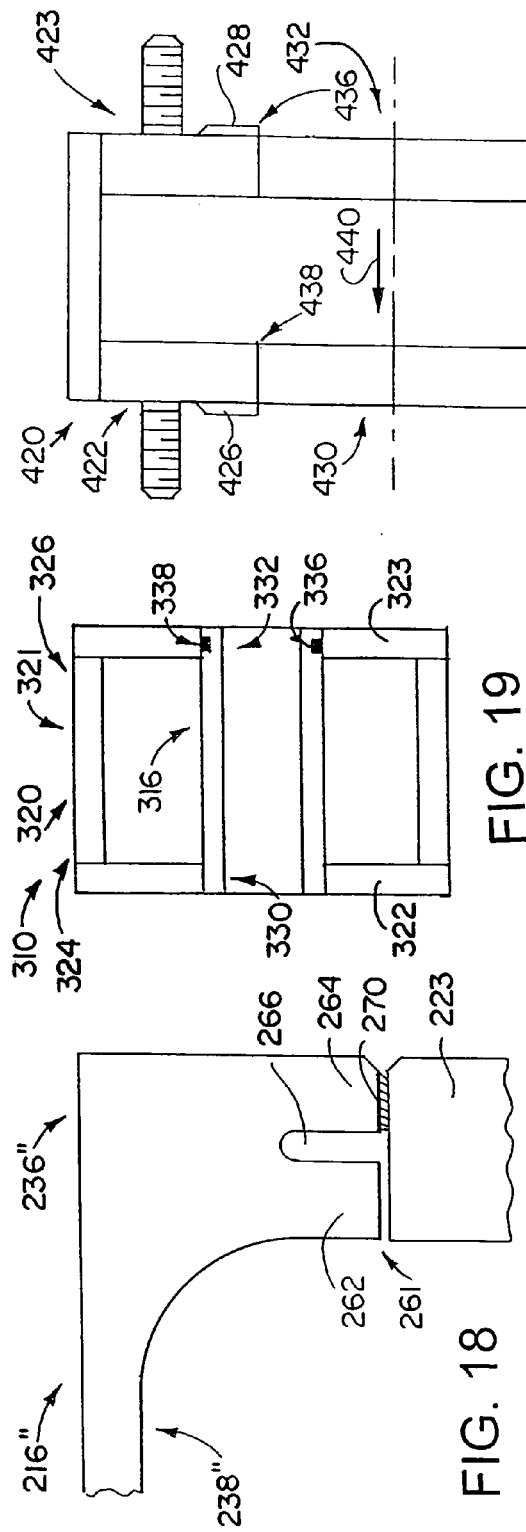

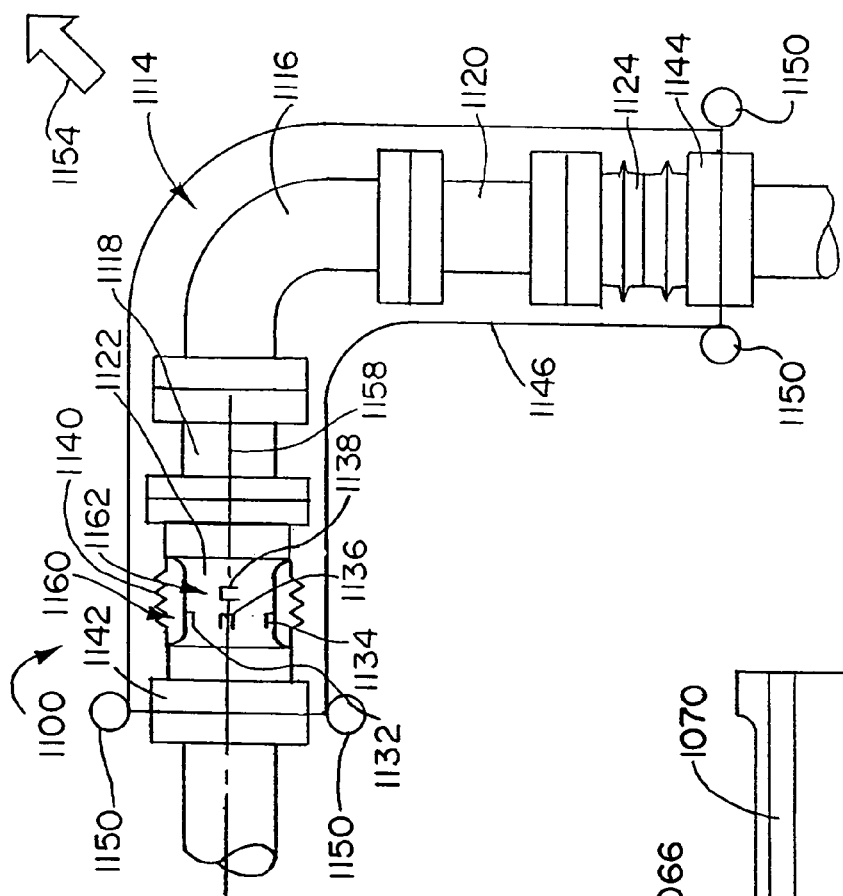
FIG. 31
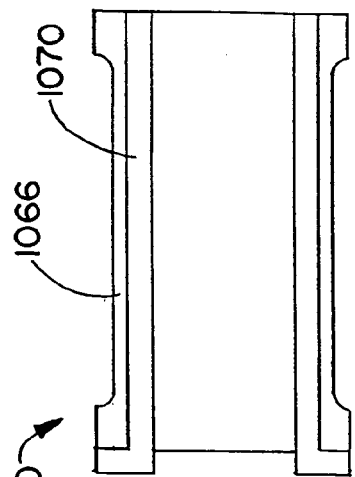
FIG. 30
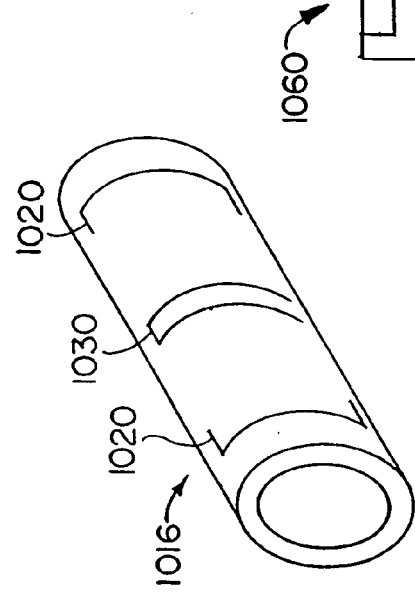
FIG. 28
FIG. 29

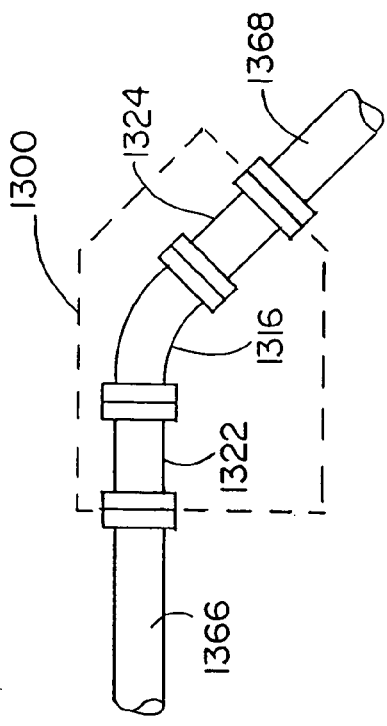
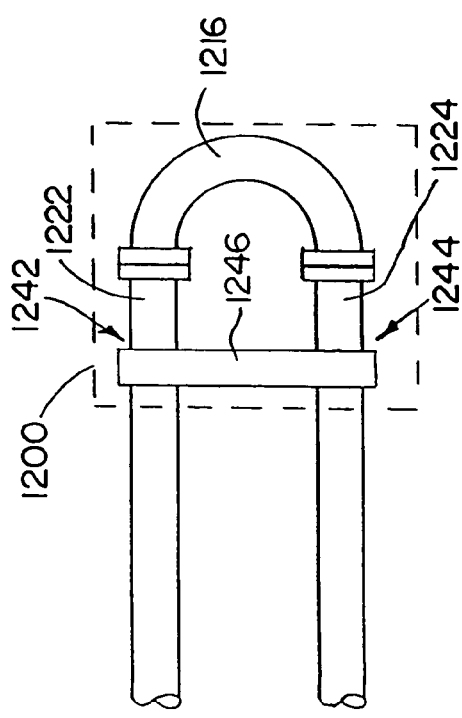
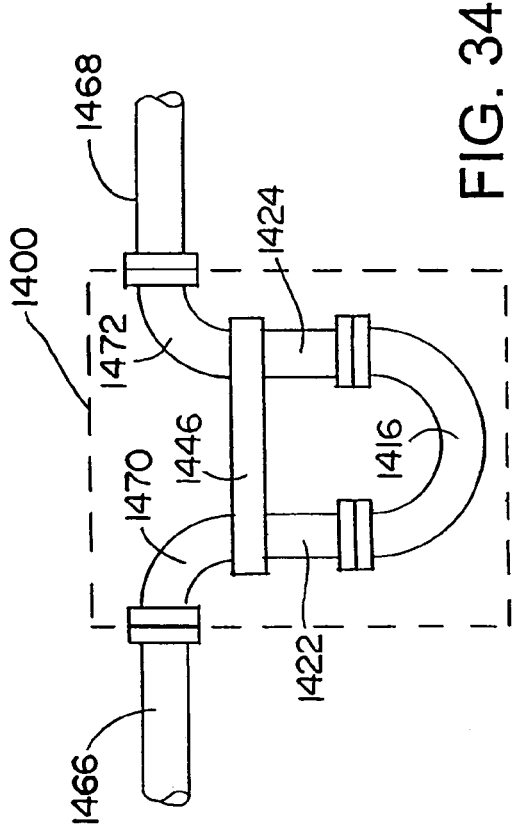

FLUID MEASURING DEVICE AND METHOD

This application claims the benefit of U.S. Provisional Application No. 60/141,506, filed Jun. 28, 1999, which is incorporated herein by reference in its entirety.

TECHNICAL FIELD

The present invention relates to pressure and flow rate transducers and methods for measuring pressure and flow rate. More particularly, the present invention relates to transducers and methods for measuring pressure of fluid flowing in a tube.

BACKGROUND OF THE INVENTION

The general problem of measuring flow rates and pressures of flowing fluids and fluid-like substances occurs in a wide variety of circumstances. Methods of measuring flow rates in a pipe often involve insertion of a probe or diversion of a portion of the flowing fluid. Such methods of measuring flow rate may involve undesirable disturbances of the flow and/or possible flow contamination. In traditional installations, where a pressure probe is offset from the flow, the added volume may entrap the material flowing in the line and present additional problems, such as clogging or bacteria growth.

In a particular exemplary flow measurement problem, that of measuring the pressure of slurries such as liquid concrete flowing in a tube, one method of isolating the slurry flow from the pressure transducer is to inject grease into a fluid line running from the tube to the pressure transducer while the measurement is being made. This intervening grease blocks concrete from reaching the pressure transducer, transmits pressure to the pressure transducer, and prevents damage to the pressure transducer. However, such a method is not suitable for continuous pressure measurement since grease must be injected before and during measurement. Some of the grease may be picked up by the flowing slurry, whereby such a method may introduce grease as an impurity to the slurry flow. Such an impurity may be unacceptable, whether the slurry is a flow of concrete, foodstuffs, or some other material.

Another method of measuring pressure in slurry flows involves measuring pressure of a sensing fluid in an isolated annular region. Between the sensing fluid and the slurry flow is an elastomeric cylinder which is to deform and thereby to transmit pressure from the slurry flow to the sensing fluid. An example of such a system is shown in U.S. Pat. No. 4,218,926, issued to DeVisser, entitled "Isolating Pressure Sensor." Such systems have the disadvantages of being complicated and costly, as well as using an elastomeric material such as Buna-N, which may be unsuitable for contact with a corrosive or abrasive fluid or slurry.

In addition to slurries, it will be appreciated that there are many other fluids that may cause damage to a pressure transducer that is exposed to them. Examples of such fluids and fluid-like mixtures are corrosive materials and slurries or other mixtures containing abrasive materials.

From the foregoing general discussion and particular example, it may be seen that a need exists for an improved, inexpensive, and/or durable means of continuously measuring pressure and/or flow rate in flowing fluids.

SUMMARY OF THE INVENTION

A pressure transducer and method for measuring pressure of a fluid flow in a tube include use of a sensing tube through which the pressurized flow passes. The sensing tube deforms outward in response to the pressurized flow within. Deformation measuring devices, such as strain gages, measure the outward deformation (axial and/or circumferential strains) and allow computation of the pressure of the flowing fluid. A housing surrounds the sensing tube to relieve extraneous stresses on the sensing tube, to prevent damage to the sensing tube, and to contain any rupture of the sensing tube. The sensing tube and housing may have a round, rectangular, or other shape cross-section. The pressure transducer allows continuous and non-invasive measurement of pressure inside a tube. In addition, a flow restriction such as an orifice may be provided in the sensing tube to enable a flow rate to be determined from the pressure drop across the flow restriction. Further, measuring device for measuring flow rate may utilize a sensing tube that bent (strained) because of forces causes by a change of momentum of flowing fluid due to a direction change of the fluid.

Broadly stated, the invention involves measuring outward changes in shape of at least a portion of a sensing tube which contains a pressurized fluid, such as a fluid flowing therethrough. The changes in shape are related to inner pressure, and measurements of the strains may be used to determine the pressure within the tube. Strain gages may be used for measuring outward deformations due to the shape changes. A pressure transducer embodying the invention may be installed in a pipeline through which the fluid flows.

According to an aspect of the invention, a pressure transducer includes a sensing tube at least a portion of which mechanically deforms in response to a pressure on one side thereof, and at least one strain gage on the sensing tube for measuring deformation of the at least a portion of the sensing tube.

According to another aspect of the invention, a pressure transducer includes a sensing tube at least a portion of which changes shape in response to a pressure on one side thereof, and a sensor for measuring the changes in shape of the at least a portion of the sensing tube.

According to yet another aspect of the invention, a method of measuring fluid pressure includes measuring strain in a flow passage due to fluid flowing therewithin, as a representation of the fluid pressure.

According to a further aspect of the invention, a flow measuring device includes a sensing tube having a flow restriction therein, the sensing tube having an upstream portion which changes shape in response to an upstream pressure upstream of the flow restriction, and a downstream portion which changes shape in response to a downstream pressure downstream of the flow restriction; an upstream sensor for measuring changes in shape of the upstream portion; and a downstream sensor for measuring changes in shape of the downstream portion.

According to a still further aspect of the invention, a measurement device includes a body defining a flow passage therethrough, the flow passage having an inlet direction, and an outlet direction different from the inlet direction; a sensing element attached to one end of the body, the sensing element having a strain gage thereupon for measuring deformation of at least a portion of the sensing element; and a flexible element attached to an opposite end of the body and allowing flow therethrough in communication with the flow passage.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings:

FIG. 1 is an exploded view of a pressure transducer in accordance with the present invention;

FIG. 2 is a perspective view of the assembled pressure transducer of FIG. 1;

FIG. 3 is a perspective view of a sensing tube of the pressure transducer of FIG. 1;

FIGS. 9 and 10 are plan and side views, respectively, of a housing cover of the pressure transducer of FIG. 1;

FIGS. 11 and 12 are plan and side views, respectively, of an access door of the pressure transducer of FIG. 1;

FIG. 18 is a fragmentary side view of an alternate embodiment sensing tube having a circumferential groove which separates inner and outer members on an end portion;

FIG. 19 is a side view of an alternate embodiment pressure transducer which has a housing with increased stiffness and which has a sensing tube which is slidably mounted with one housing flange;

FIG. 20 is a side view of an alternate embodiment housing having increased stiffness;

FIG. 21 is a sectional view of another alternate embodiment housing;

FIG. 22 is a perspective view of an alternate embodiment sensing tube having a rectangular cross-section;

FIG. 28 is a sectional view of another alternate embodiment pressure transducer with an optical displacement sensor for measuring deflections in a sensing tube;

FIG. 29 is a perspective view of an alternate embodiment sensing tube with strain gages which extent over a substantial amount of the perimeter of the tube;

FIG. 30 is a sectional view of an alternate embodiment sensing tube with an energy-absorbing liner; and FIGS. 31–34 are side views of flow measurement device embodiments in accordance with the present invention.

DETAILED DESCRIPTION

Figure 4:
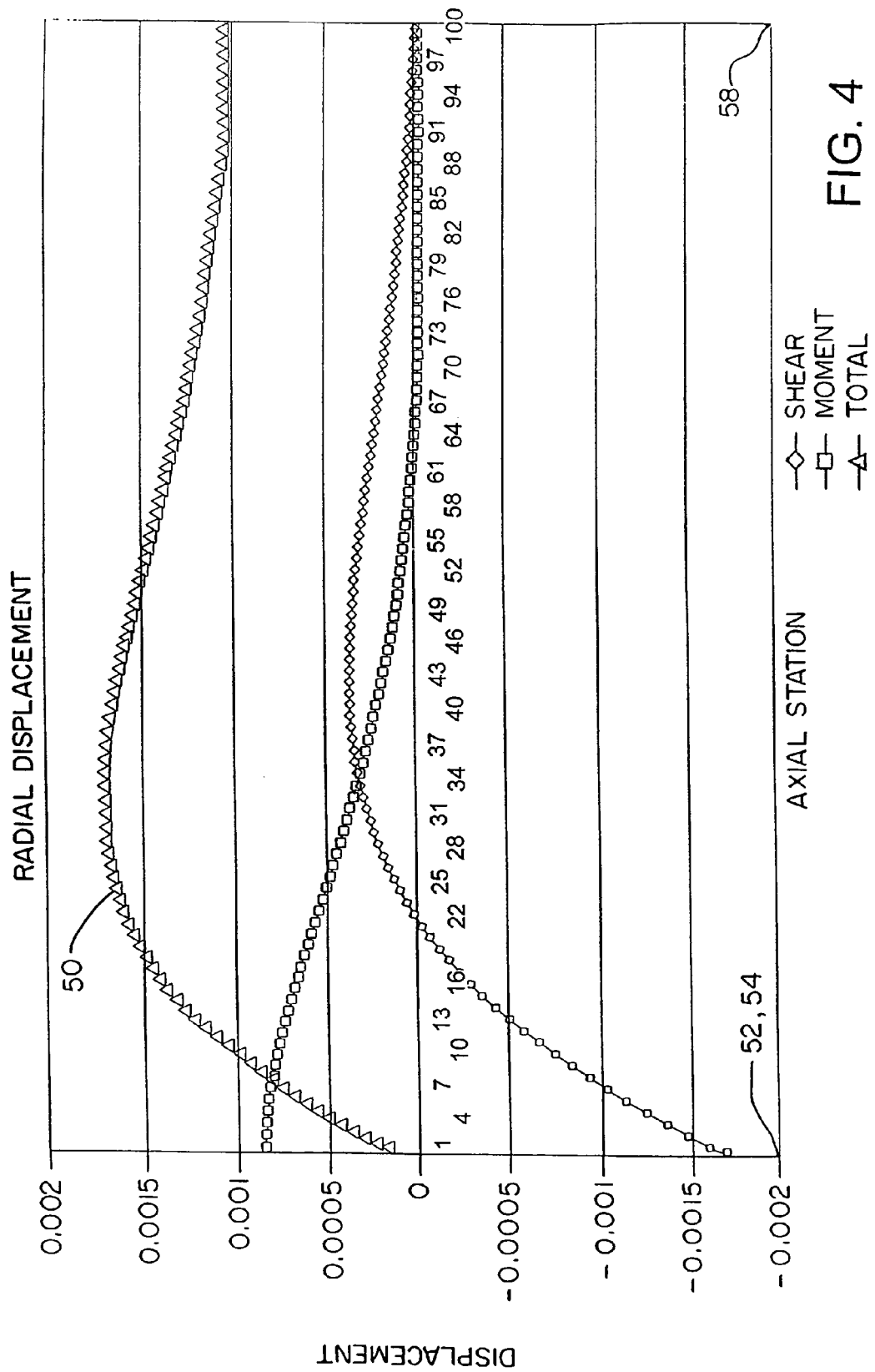
FIG. 4 is a graph showing the radial displacement of the sensing tube as the function of axial position.

Referring to FIGS. 1 and 2, a pressure transducer 10 is shown for measuring the pressure of a fluid flow within a pipe, a portion of which is shown generally as pipe segments 12 and 14. The term "fluid," as used herein, includes liquids, gases, slurries, and multi-phase colloidal and non-colloidal mixtures such as gels, emulsions, fogs, foams, smokes, and gas-liquid, liquid-solid, and gas-solid mixtures, as well as other things that flow. The present invention is particularly useful for measuring pressures of flows of abrasive materials, as well as for measuring pressures in fluid flows were disturbance of the flow is undesirable.

The pressure transducer 10 includes a sensing tube 16 which is surrounded or encircled by a housing 20. The housing 20 includes a cover 21 which is attached to housing flanges 22 and 23. The sensing tube 16 fits within the housing 20 and is connected to the housing flanges 22 and 23.

The sensing tube 16 and the housing 20 are coupled to the pipe segments 12 and 14 via pipe flanges 24 and 26 which also connect the pipe segments 12 and 14 to the housing 20. The flow from one of the pipe segments to the other thereby passes through the sensing tube 16. Pressure within the sensing tube 16 causes the tube to bow outward. This bowing outward elastically changes the shape of the sensing tube—the tube deforms and portions of the sensing tube deflect outward. This change of shape, in particular the outward deformation, under internal pressure, is detected and measured by means of strain gages 30 mounted on the outside of the sensing tube 16. The readings from the strain gages 30 are then used to determine the pressure within the sensing tube 16, using well-known relationships between pressure and strain, such as those found in Roark, Raymond J., Formulas for Stress and Strain, 4th ed., McGraw-Hill, 1965, which is incorporated herein by reference in its entirety. In particular, useful formulas for the present purpose are shown on page 302 in Table XIII—Formulas for Stress and Deformation in Pressure Vessels.

The parts of the pressure transducer 10 are explained in greater detail below.

Referring to FIG. 3, the sensing tube 16 is shown as a hollow cylinder. At either end of the sensing tube 16 are end portions 34 and 36 of the tube 16. The end portions 34 and 36 connect to the housing flanges 22 and 23, respectively, fitting into respective holes 38 and 40 in the housing flanges 22 and 23. The end portions 34 and 36 are connected to the housing flanges 22 and 23 by, for example, welding. It will be appreciated that other means, for example, soldering, braising, threading, or other techniques, may be employed to attach the end portions 34 and 36 to the housing flanges 22 and 23.

Preferably the inner diameter D and cross-sectional shape of the sensing tube 16 are substantially the same as the inner diameter and shape of the pipe segments 12 and 14. Such equal diameter and also a similar or identical cross-sectional shape allow the sensing tube and pipe segments 12, 14 to appear to fluid therein as a continuous flow path, unimpeded in the area of sensing tube 16 and pipe segments 12, 14 and avoiding creating turbulence, pressure drops and so forth. However, if desired, the inner diameter of the sensing tube may be greater or lesser than that of the pipe segments or of different cross-sectional shapes from those of the pipe segments 12 and 14.

As the interior of the sensing tube 16 is pressurized by pressurized fluid flowing therethrough, a central portion 44 of the sensing tube 16 deforms outward due to the internal pressure force upon it. Some deformation also may occur in the end portions 34 and 36 of the sensing tube 16, but such deformation usually is substantially less than occurs at the central portion 44 because the end portions 34, 36 are restrained by the housing flanges 22 and 23. It will be appreciated that the deformation of the central portion 44 will generally be axisymmetric since the central portion is axisymmetric.

A graph in FIG. 4 shows a curve 50 representing an exemplary typical deformation of the central portion 44. The horizontal axis of FIG. 4 represents the axial position along the sensing tube 16, with the left side of the graph being the inner edge of one of the end portions 34 and 36. This is where the respective housing flange 22 or 23 no longer contacts the end portion 34 or 36. This position is indicated in FIG. 3 by dotted lines 52 and 54. The right end of the horizontal axis represents the middle of the sensing tube, indicated in FIG. 3 by the dotted line 58. The vertical axis of FIG. 4 is the radially-outward displacement of the sensing tube from the unstressed condition represented at zero on the vertical axis. It will be recognized that the vertical and horizontal axes are differently scaled, and that the apparent shape of the tube in FIG. 4 greatly exaggerates the radial displacements.

The model used to produce FIG. 4 treats the housing flanges 22 and 23 as completely rigid, and therefore the radial displacement 50 is zero at the left side of FIG. 4, which is at the boundaries 52 and 54 of the end portions 34 and 36. Moving rightward along FIG. 4 the displacement 50 reaches a peak value and then slowly declines, achieving a profile with substantially zero slope at the middle 58 of the sensing tube 16. The middle 58 is shown as a dotted line in FIG. 3.

Figure 5:
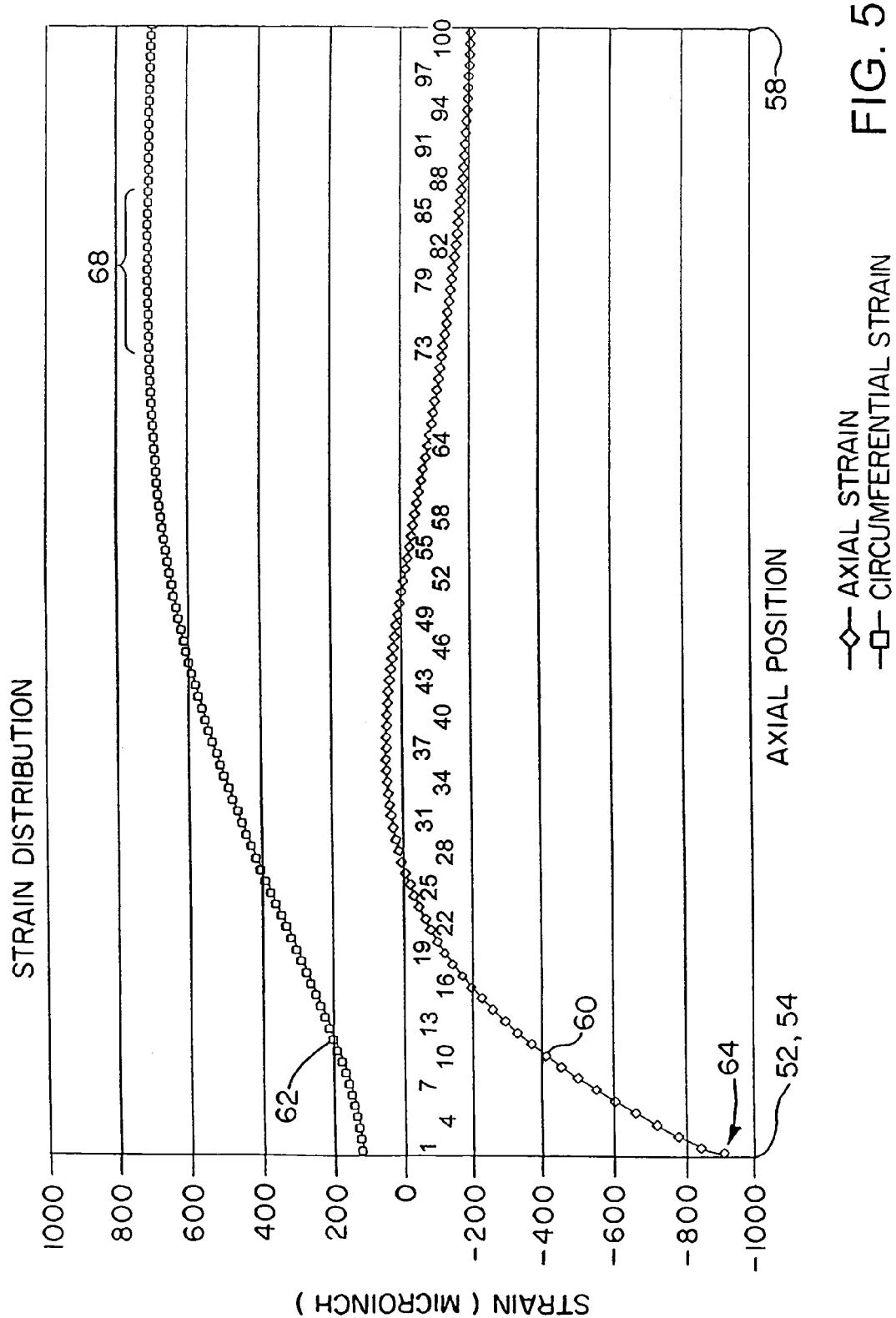
FIG. 5 is a graph showing the axial and circumferential strain distribution in the sensing tube of FIG. 3 as a function of axial position.

Referring to FIG. 5, a graph of the strain distribution along the sensing tube is shown as a function of axial position. As in FIG. 4, the horizontal axis of FIG. 5 is axial position, with the left side corresponding to the edges 52 and 54 of the end portions 34 and 36, and the right side corresponding to the middle 58 of the sensing tube 16. The vertical axis is the magnitude of the strains, with tensile strains positive and compressive strains negative.

Both axial strain 60 and circumferential strain 62 are plotted in FIG. 5. The axial strain 60 has its greatest magnitude closest to the housing flanges 22 and 23, at the position indicated as 64 in FIG. 5. The greatest magnitude strain occurs at the position 64 due to the stain concentration from the reinforcing flange used for attachment, and from the local fillet radius. The axial strain 60 is negative at this location, indicating that the outside of the sensing tube 16 is being compressed in the axial direction. Moving rightward along FIG. 5, toward the middle 58 of the sensing tube 16, the axial strain 60 rises, becoming slightly positive before becoming negative again.

In contrast, the circumferential strain 62 is always positive. Thus the sensing tube 16 is circumferentially in tension at all places. This is to be expected since the radial displacement 50 shown in FIG. 4 is always positive, indicating that there is a positive outward hoop stress on the sensing tube 16 at all axial locations. The circumferential strain 62 is nearly zero along the edges 52 and 54, and increases to a peak value in a region 68 somewhat away from the middle 58 of the sensing tube 16.

For reasons explained below, it is desirable to measure both axial and circumferential strains on the sensing tube 16. In order to get the best response, strain gages 70 and 71 for measuring axial strain should be placed at position 64 (see graph of FIG. 5), as close as possible to the end portion edges 52 and 54. Strain gages 72 and 73 for measuring circumferential strain should preferably be placed in the region 68 where maximum circumferential strain occurs. Although placement of the strain gages 70–73 at the positions 64 and 68 result in the highest response to deformations of the sensing tube 16, it will be appreciated that alternatively the strain gages may be placed in other positions on the sensing tube.

Since the sensing tube 16 deforms outward when containing a pressurized fluid, the sensing tube 16 will generally be made of a thinner material than the pipe segments 12 and 14. The sensing tube may be made of the same material as the pipe segments, or alternatively may be made of a different material. The sensing tube may be made from a wide variety of generally rigid materials such as metals, plastics, and resins. By "generally rigid" it is meant that the material undergoes some deformation when stressed, but does not undergo gross deformations or changes of shape.

If desired, the sensing tube may be made of a material that withstands degradation from a corrosive or abrasive fluid flowing through the sensing tube.

It may be desirable to make the sensing tube from a higher strength material than that of the pipe segments, thus allowing the sensing tube to be even thinner.

The strain gages 70–73 may be solid state gages and/or foil strain gages. Such strain gages are commercially available and are well known. It will be appreciated that well-known methods of mounting strain gages to both electrically conducting and electrically non-conducting materials are available, and such methods will not be explained further here.

Wire leads 74 are used to connect the strain gages 70–73 to appropriate circuitry for measuring strains. It will be appreciated that there may be one or more intervening connections between the strain gages 70–73 and the appropriate circuitry.

Figures 6, 7, 8:
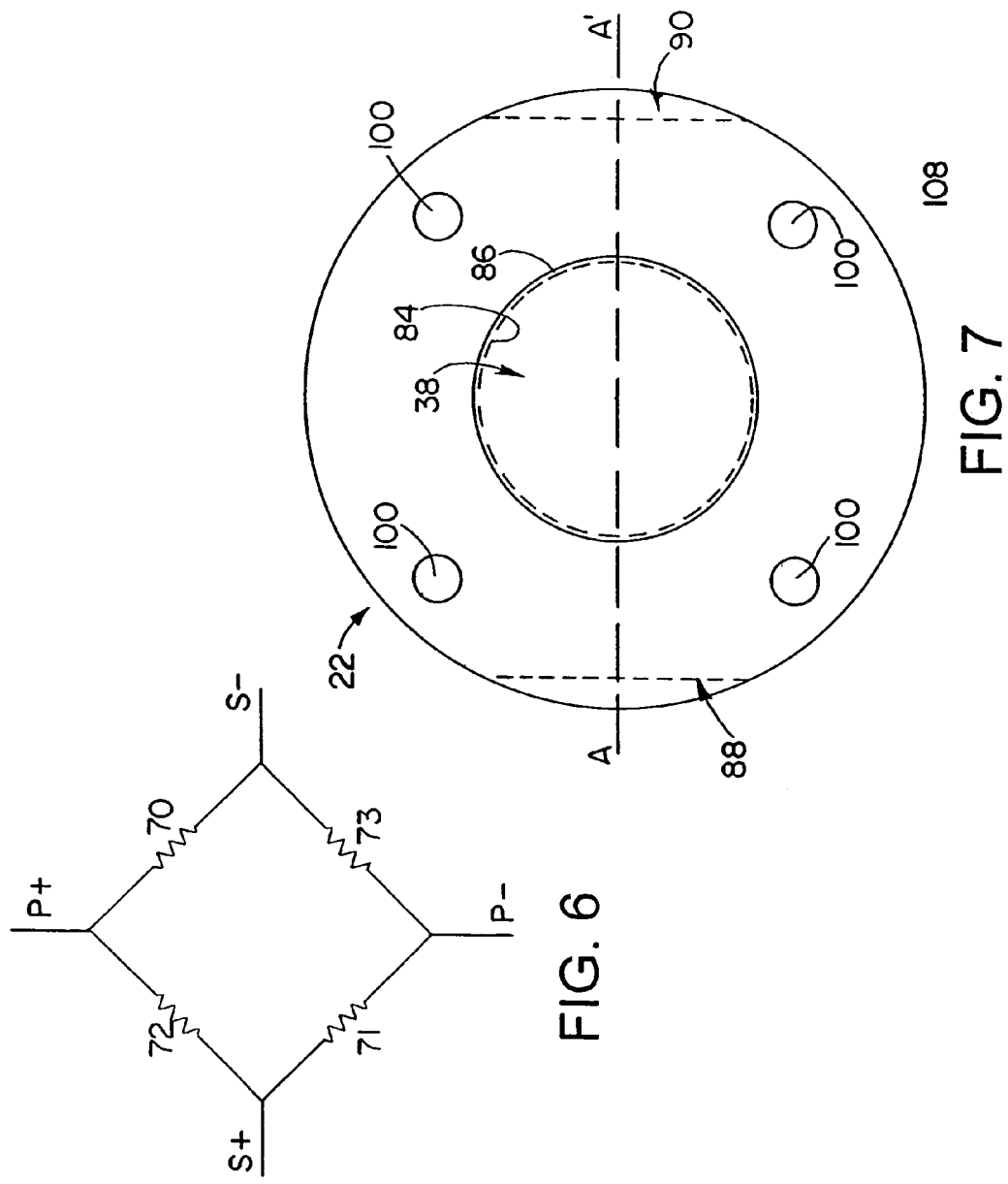
FIG. 6 is a diagram of a Wheatstone Bridge connection of the strain gages of the pressure transducer of FIG. 1.
FIGS. 7 and 8 are plan and side views, respectively, of a housing flange of the pressure transducer of FIG. 1.

Turning now to FIG. 6, a general wiring diagram for the strain gages 70–73 is shown. As can be seen, the strain gages 70–73 are configured as part of a Wheatstone Bridge. Specifically, strain gages 70–73 are connected together end-to-end to form the arms of the Wheatstone Bridge. The node between the gages 70 and 72 serves as the P+ terminal. The node between the gages 70 and 73 serves as the S–terminal. The node between the gages 71 and 73 serves as the P–terminal, and the node between the gages 71 and 72 serves as the S+ terminal. Wire leads 74 from the respective P+, P–, S+ and S– terminals are connected to the strain gages and extend from the sensing tube to an electrical connector 80 which is mounted on the housing 20 as shown in FIGS. 1 and 2. Suitable electrical connectors for this purpose are well known.

The leads 74 allow the gages 70–73 to be connected to appropriate external circuitry (not shown) for analyzing the signal from the Wheatstone Bridge formed by the strain gages 70–73. Such external circuitry may include circuitry to balance the bridge and/or to provide power and calibration, as well as to provide amplification. Such circuitry is considered conventional and consequently further detail concerning the circuitry has been omitted.

The circuitry or a portion thereof may be on a circuit board which may be mounted in the housing 20. It will be appreciated that the output signal from the circuit board may be transmitted to an external receiver without a hard-wired connection, for example by means of radio waves or the like.

Alternatively, it will be appreciated that the resistance of the strain gages may be measured other than by use of a Wheatstone Bridge. For example, the resistance of the strain gages may be measured directly by use of an ohmmeter.

It will be appreciated from FIG. 6 that the strain gages 70–73 are configured in the Wheatstone Bridge such that the outputs of the strain gages 70, 71 which measure compressive (negative) axial strains are subtracted from the outputs of the strain gages 72, 73 which measure tensile (positive) circumferential strains. With such a configuration, the output from the Wheatstone Bridge is an indication of twice the sum of the tensile and compressive strains. It will be appreciated that this configuration increases the signal from the transducer, for example doubling it. This increased signal results in greater sensitivity of the output from the pressure transducer.

The strain gages 70, 71 used to measure axial compressive strain will preferably be oriented perpendicular to the strain gages 72, 73 which measure the circumferential tensile strains, as shown in FIG. 3. More particularly, the strain gages 70, 71 will preferably be oriented to capture the maximum strain in the axial direction, and the strain gages 72, 73 will preferably be oriented to capture the maximum strain in the circumferential direction.

However, it will be appreciated that other configurations and orientations of the strain gages are possible. In addition, there may be more or fewer gages than those illustrated.

Referring to FIGS. 7 and 8, details of the housing flange 22 are shown. As discussed earlier, the central hole 38 of the housing flange 22 is sized to allow a close fit with the sensing tube 16. An inner surface 84 of the central hole 38 abuts one of the end portions 34 or 36 of the sensing tube 16. A welding flange 86 may be provided along the outer face of the central hole 38 in order to aid in welding the end portion 34 or 36 to the housing flange 22.

The housing flange 22 has a pair of flat surfaces 88 and 90 provided thereon. The flat surfaces help support access doors 94 and 96 (FIGS. 1 and 2), which are described in greater detail below. It will be appreciated that there may be more or fewer doors than shown. It will be further appreciated that the housing flange may alternatively have no access doors.

The housing flange 22 also has a number of threaded holes 100 therein. The threaded holes 100 received threaded connectors such as bolts 102 (FIGS. 1 and 2) used to connect the housing flange 22 to the pipe flange 24. Preferably the threaded holes 100 are all located at the same radial distance away from the center of the pipe flange 22. Also preferably the threaded holes 100 are located symmetrically about the housing flange 22. Further, preferably the threaded holes 100 are located symmetrically away from a line A—A' which is perpendicular through the centers of the flat surfaces 88 and 90. It will be appreciated there may be more or fewer threaded connectors and threaded holes than shown.

The bolts 102 are preferably securely attached to the housing flange 22, such as by tack welding, soldering, or gluing them in place. It will be appreciated that the bolts may not necessarily be attached to the housing. In addition, threaded studs may be used in place of the bolts.

The outside of the housing flange 22 has a beveled edge 106 to aid in welding a circumferential surface 108 of the housing flange 22 to the cover 21.

Preferably the housing flanges 22 and 23 are substantially identical. However, it will be appreciated that the flanges may be different.

Details of the cover 21 are shown in FIGS. 9 and 10. The cover is preferably cylindrical in shape. The cover 21 has openings 110 and 111 therein to allow access to an interior region 112. The opening 110 has flat surfaces 116 on either side. The flat surfaces 116 have threaded holes 118 therein for receiving and securing the access doors 94 to removably cover the openings 110. The opening 111 has similar flat surfaces with threaded holes therein.

As noted earlier, an outer surface 108 of the housing flange 22 (and a similar outer surface of the housing flange 23) are designed to be welded to an inner circumferential surface 120 of the cover 21, thereby to form a housing 20.

The housing 20 transmits external loads between the pipe segments 12 and 14. For example, such loads are encountered when the pipe segments 12 and 14 are moved relative to each other by translation, bending, or twisting. It is desirable that such loads be transmitted through the housing 20 as opposed to through the sensing tube 16. This is because the sensing tube 16 is relatively susceptible to damage, since as noted above it will generally be thinner in order that it may deform due to pressure within it. In addition, bending may induce undesirable strains in the sensing tube giving errors in the pressure readings.

The housing 20 also serves to protect the relatively fragile sensing tube 16 from other external forces. For example, the housing 20 protects the sensing tube 16 from having a dropped object directly impact it.

The housing 20 also protects from damage the strain gages 70–73 and the wire leads 74.

Further, the housing 20 acts as a safety feature by containing any rupture that might occur in the sensing tube 16. Since the sensing tube 16 is generally thinner and more liable to deform than the adjoining pipe segments 12 and 14, the sensing tube 16 is also more liable to rupture. The housing 20 acts to contain the pipe contents that would escape the sensing tube 16 as the result of such a rupture. Thus loss of fluid due to a rupture is minimized, as is the possible safety risk from fluid escaping from a ruptured tube.

It will be appreciated that the flat surfaces for supporting the access doors 94 and 96, such as flat surfaces 88 and 90 of the housing flanges 22 and 23, and the flat surfaces 116 of the cover 21, may be machined after the cover 21 and the housing flanges 22 and 23 are welded or otherwise joined together.

Referring to FIGS. 11 and 12, details of the access door 94 are shown. It will be appreciated that the access door 96 may include similar details, and may in fact be substantially identical to the access door 94.

The access door 94 has a base 122 with flanges 123 attached thereto. The flanges 123 provide structural support for the access door 94. They also provide grips to aid in installing or removing the access door 94. The flanges and the base may formed from a single piece of material, such as by bending sheet metal or by cutting a piece of C-channel.

The base 122 has holes 124 therein. The holes 124 allow passage through the base 122 of threaded connectors such as screws 126 (FIGS. 1 and 2). The screws 126 secure the access door 94 to the cover 21 by mating with the threaded holes 118. The base 122 also has a central hole 130 for mounting the electrical connector 80 (FIGS. 1 and 2) to the access door 94.

It will be appreciated that the access door 96 need not also have an electrical connector, and therefore need not have a central hole corresponding to the central hole 130. It will further be appreciated that the central hole need not be centrally located on the base of the access door, but may alternatively be located elsewhere on the base.

The access door 94 is preferably made of the same material as the rest of the housing 20, or may be made of another material. For example, the access doors may be made of a stronger material than the rest of the housing, taking into account that the access door may be made of thinner material than the cover.

Figure 14:
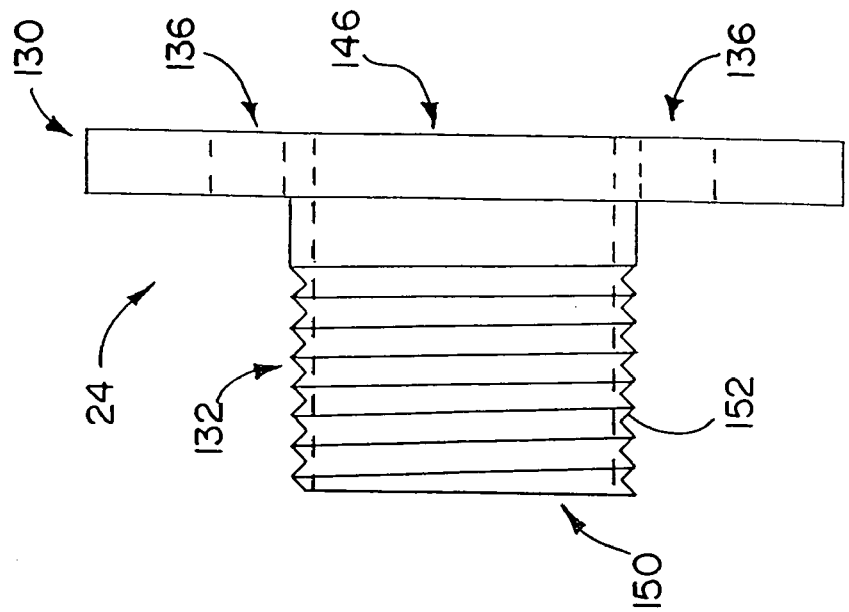
FIGS. 13 and 14 are plan and side views, respectively, of a pipe flange of the pressure transducer of FIG. 1.
Figure 13:
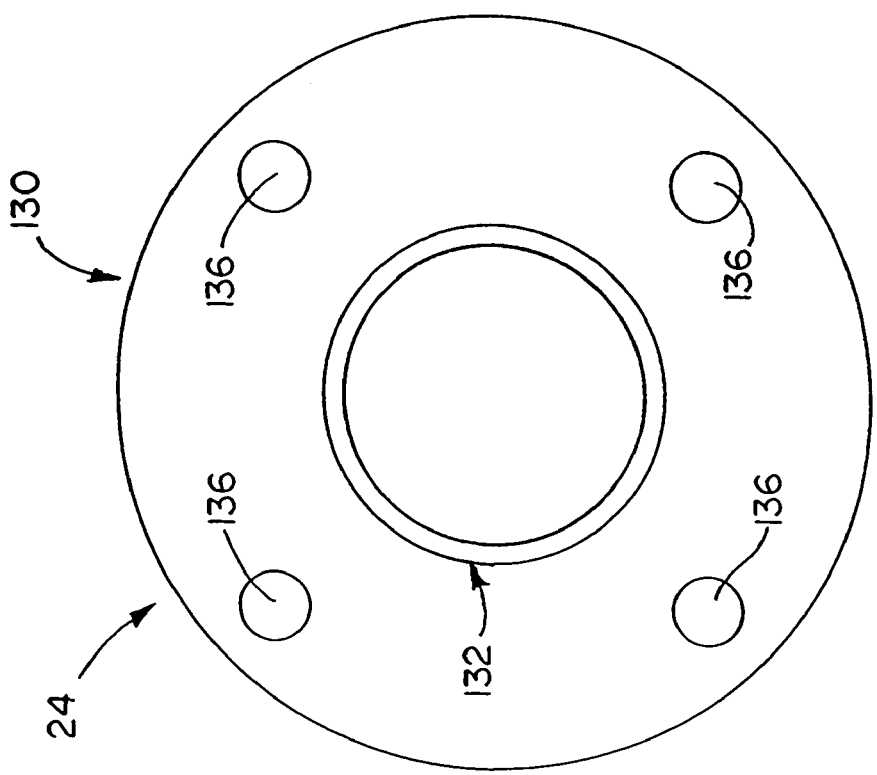

Turning now to FIGS. 13 and 14 details of the pipe flange 24 are shown. The pipe flange 24 includes a flange portion 130 and a pipe connection portion 132. The portions 130 and 132 may be formed as a single piece, or alternatively may be attached one to another by welding, for example.

The flange portion 130 has holes 136 therein corresponding in location to the holes 100 of the housing flange 22. The holes 136 are large enough to allow the threaded portions 138 of the bolts 102 to pass therethrough. Nuts 140 may be screwed on the threaded portions 138 of the bolts 102 to secure the pipe flange 24 to the housing flange 22. A flexible seal 142 is used to seal the connection between the pipe flange 24 and the housing flange 22. The seal 142 is radially outboard of a bore 146 of the flange portion 130, and radially inboard of the holes 136. It will be appreciated that the material of the seal and the type of seal may be selected depending upon the fluid to be enclosed by the seal and upon the magnitude of the pressure to be maintained by the seal.

The pipe connection portion 132 has a central bore 150 and an exterior thread 152. Preferably the central bore 150 of the pipe connection portion 132 has substantially the same diameter as, and is aligned with, the bore 146 of the flange portion 130. Even more preferably, the bores 146 and 150 are the same diameter and are aligned with the bores of the sensing tube 16 and of the pipe segments 12 and 14. With all of the bores aligned and having the same diameter, there are no steps or other obstructions that would unduly disrupt the flow of the fluid through the pressure transducer. Also, there are no obstructions which would serve to trap fluid passing through the pressure transducer 10.

The exterior thread 152 on the pipe connection portion 132 is designed to mate with a corresponding interior thread on the pipe segments 12 and 14. However, it will be appreciated that other ways of coupling the pipe flange to the pipe segment are possible. For example the pipe flange may have an internally threaded portion which mates with an external thread on the pipe segment. Alternatively, a fitting coupled to the pipe segment could be used to mate with a corresponding fitting on the pipe flange. It may alternatively be possible to weld or otherwise attach the pipe flange directly to the pipe segment. It will be appreciated that many methods of coupling pipes to fittings are known in the art and suitable of them may be employed in the present invention.

It will be appreciated that the pipe flange may have a different number of holes, for example eight, with a corresponding number of threaded connectors in the housing flange.

Further, it will be appreciated that the above-described use of pipe flanges to couple the housing to pipe segments is illustrative of a wide variety of possible pipe connectors and pipe connecting mechanisms for joining the pipe segments and the housing. Alternatively, for instance, one or both ends of the housing may be able to mate with a standard or non-standard fitting which is coupled to a pipe segment. As such a portion of the housing may be externally- or internally-threaded, for example. Alternatively, one or both ends of the housing may be mateable with a standard or non-standard quick disconnect coupling.

What follows are descriptions of a number of alternate embodiments of various parts of the transducer of the present invention. Features common to the above-described embodiment and various of the alternate embodiments are generally referred to only as needed to describe the particular features of the alternate embodiments.

Figure 15:
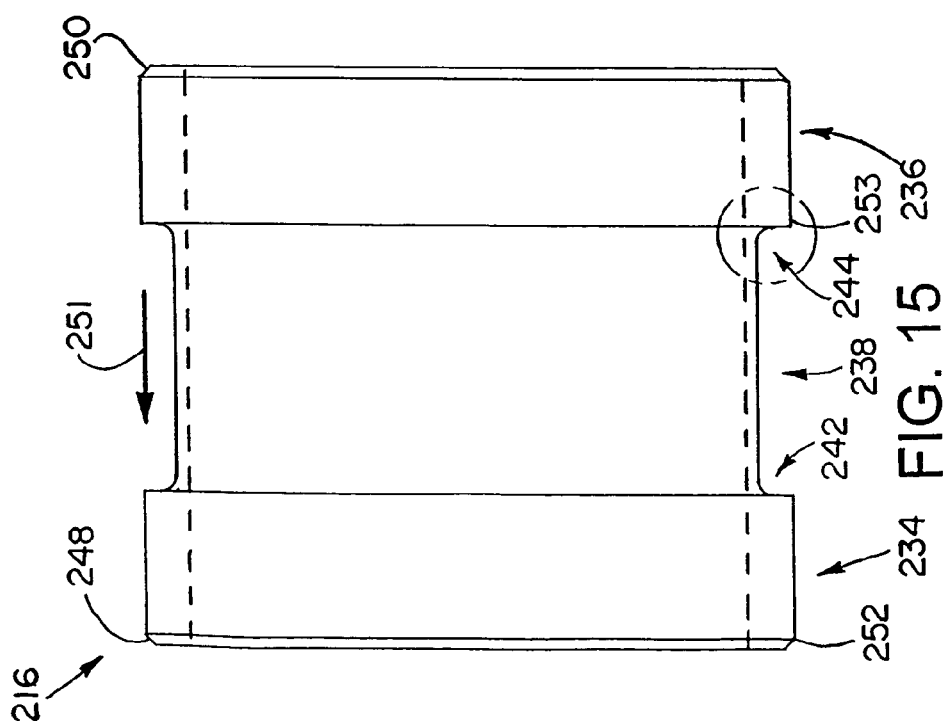
FIG. 15 is a side view of an alternate embodiment sensing tube.

An alternate embodiment sensing tube 216 is shown in FIG. 15. The sensing tube 216 has end portions 234 and 236 which are thicker than a central portion 238 of the sensing tube 216. Transition regions 242 and 244 link the respective end portions 234 and 236 with the central portion 238.

The end portions 234 and 236 each attach to a suitable housing flange. The end portions 234 and 236 have respective beveled edges 248 and 250 to facilitate welding of the end portions to the housing flanges. It will be appreciated that the length of the end portions may be greater than, the same as, or less than the thickness of the housing flanges.

The end portion 234 has a slightly smaller diameter than the end portion 236. The mating housing flanges also have slightly different central bores to accommodate this difference in end portion diameters. Accordingly, the sensing tube 216 is designed to be inserted in one direction only, as indicated by arrow 251 in FIG. 15. During assembly, the end portion 234, being slightly narrower, passes easily through the housing flange which has a hole sized to enable press fitting of the end portion 236. Then both end portions are press fit simultaneously into their respective housing flanges. To further facilitate insertion in the direction 251, the end portions 234 and 236 are provided with respective slightly tapered lead portions 252 and 253.

It will be appreciated that alternatively the end portions may have identical diameters, thus allowing the sensing tube to be inserted in either direction. Further, one or both end portions may alternatively be mechanically attached to their respective housing flanges.

Figure 16:
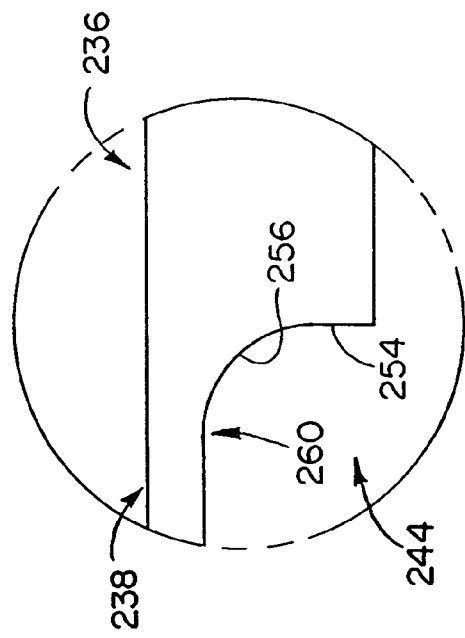
FIG. 16 is an enlarged fragmentary detailed view of a transition region of the sensing tube of FIG. 15.

Referring to FIG. 16, a detailed view of the transition region 244 is shown. In the transition from the end portion 236 to the central portion 238 there is a radially inward surface 254 which smoothly transitions into a curved portion 256 of constant radius. The curved portion 256 then transitions smoothly into the central portion 238.

As will be recalled from the discussion above in regard to FIG. 5, for a sensing tube 16 with uniform wall thickness the magnitude of the axial strain is greatest closest to where the sensing tube 16 is attached to the housing flanges 22 and 23. This is the location where it is most advantageous to place the strain gages which measure axial stress. Moreover, for the sensing tube 16 placement as close as possible to the ideal location is further desirable because the axial strain decays quickly as one moves away from the ideal location, as shown in FIG. 5.

In contrast, for the sensing tube 216, the ideal location for placing a strain gage to measure axial strains is at the boundary where the transition region 244 transitions to the middle region 238. This is shown in FIG. 16 as location 260.

It is preferable that the transition region have a curved shape. This is because a sharp corner between the end portions and the middle portion would cause a stress concentration at the sharp corner that could result in cracking or fracture of the tube.

An additional advantage of the sensing tube 216 is that the surface of the central portion 238 does not slide against the housing flanges when the sensing tube 216 is installed in the housing flanges. Therefore strain gages may be installed on the sensing tube 216 prior to its installation in the pressure transducer housing. It will be appreciated that if the difference in diameters between the central portion 238 and the end portions 234 and 236 is great enough, the wires attaching the strain gages to each other and the wire leads for connecting the strain gages to external circuitry may also be installed on the sensing tube 216 prior to its installation in the pressure transducer housing. Such mounting prior to installation in the housing facilitates manufacture of the pressure transducer by avoiding the need to access the sensing tube through access doors to mount the strain gages and make connections between the strain gages.

Figure 17:
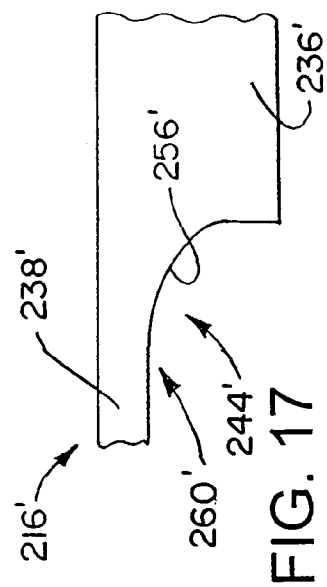
FIG. 17 is a fragmentary side view of a transition region of a further alternate embodiment sensing tube, the transition region having a non-uniform radius of curvature.

FIG. 17 shows an additional alternate embodiment sensing tube 216' which has a transition region 244' having a curved region 256' which has a non-constant radius of curvature. The transition region 244' is tapered with the curved region 256' having a radius of curvature which is at a minimum close to an end portion 236' and which gradually increases closer to a central portion 238'. The tapered shape shown in FIG. 17 may serve to further spread the region of stress concentration, thereby reducing the slope of the strain vs. axial location curve. This spreading of the stress concentration region makes the positioning of a strain gage for measuring axial strain less critical. The preferred position for positioning such a strain gage is indicated in FIG. 17 as location 260', which is the location where the transition region 244' ends and the central portion 238' begins.

It will be appreciated that other shapes may be employed for the transition region between the end portions and the central portion. Such shapes may include curved and/or tapered portions, and need not necessarily be axisymmetric.

Referring to FIG. 18 another alternate embodiment of sensing tube 216" is shown. The sensing tube 216" is similar to the sensing tubes 216 and 216'; however, the sensing tube 216" has a structural isolation 261 between its attachment to a housing flange 223 and the portion of the sensing tube 216" where strain is measured. An end portion 236" of the sensing tube 216" has a rib 262 and a connecting member 264. Between the rib 262 and the connecting member 264 is a circumferential groove 266 around the circumference of the end portion 236".

The connecting member 264 is attached to the housing flange 223, for example, via welding, as evidenced by weld material 270. The rib 262 is not directly attached to the housing flange 223. The groove 266 serves to at least partially structurally isolate the rib 262 from the connecting member 264. In essence, the part of the sensing tube 216" that is axially inboard of the connecting member 264 (particularly a central portion 238" where strains are measured) is mechanically isolated at least to some extent from loads transmitted from the housing flange 223 to the connecting member 264. This mechanical isolation means that the output of the sensing tube 216" is less susceptible to errors resulting from loads which might otherwise be transmitted from the pressure transducer housing to the sensing tube 216".

It will be appreciated that both end portions of the sensing tube preferably have a mechanical isolation mechanism such as the one described above. However, alternatively a sensing tube may have mechanical isolation only on one of its end portions, and either no mechanical isolation or a different isolation mechanism on the other end portion.

FIG. 19 shows an alternate embodiment pressure transducer 310 which has a sensing tube 316 which is slidably mounted in one of the housing flanges. In addition, the pressure transducer 310 includes a housing 320 which has a cover 321. The cover 321 is preferably cylindrical. Ends 324 and 326 of the cover 321 are attached to housing flanges 322 and 323, by welding or other suitable means.

One end 330 of the sensing tube 316 is securely attached to the housing flange 322. An opposite end 332 of the sensing tube 316 is slidably mounted within the housing flange 323. As shown in FIG. 19, the opposite end 332 has a circumferential groove 336 with a ring (sometimes referred to as an O-ring) 338 therein. The ring 338 may be made of a material which slides easily along the housing flange 323 and/or cushions the opposite end 332 from bouncing around within the opening of the housing flange 323. Thus, for example, the ring may be made of a resilient material, or may be made of a low-friction material. The ring 338 seals the connection between the opposite end 332 and the housing 323, preventing entry of fluid into the housing of the connection. Only minimal pressure is expected at this connection. It will be appreciated that many other well-known mechanisms for providing a sliding interface may alternatively be employed in the present invention.

The cushioning function mentioned above provides some structural isolation between the sensing tube 316 and the housing 320.

In the pressure transducer 310 shown in FIG. 19, the ends 324 and 326 of the cover 321 are welded to the housing flanges 322 and 323. This is in contrast to the configuration shown in FIGS. 1–2, which has a circumferential surface of each of the housing flanges being welded to the inner surface of the cover. The arrangement shown in FIG. 19 is advantageous in that it provides a stiffer housing which better withstands external loads.

Referring to FIG. 20, an alternate embodiment housing 320' is shown wherein ends 324' and 326' of a cylindrical cover 321' are attached to housing flanges 322' and 323' radially inward of respective circumferential edges 342 and 343 of the housing flanges 322' and 323'. The housing 320' provides an even stiffer structure when compared with the housing 320 shown in FIG. 19. It will be recognized, however, that there is a limit to how far radially inward the cover 321' may be located, since the cover 321' must be radially outward of threaded holes 349 and 350 of the respective housing flanges 322' and 323'.

Referring to FIG. 21, an alternate embodiment housing 420 is shown wherein housing flanges 422 and 423 have respective outer raised portions 426 and 428 to better support respective seals between the housing flanges and corresponding pipe flanges. The outer raised portions 426 and 428 preferably extend all the way around respective bores 430 and 432 of the housing flanges 422 and 423. Similar corresponding raised portions (not shown) may be provided on the pipe flanges.

In addition, outer raised portion 428 of the housing flange 423 has a beveled edge 436 and the housing flange 422 has a beveled edge 438 about the bore 432. The beveled edges 436 and 438 facilitate installation of a sensing tube through the bores 430 and 432 in the direction indicated by the arrow 440. It will be appreciated that the beveled edges facilitating installation of a sensing tube in one direction may be employed in conjunction with the sensing tube having end portions with different diameters, shown in FIG. 15 and described above.

FIG. 22 shows an alternate embodiment sensing tube 516 which has a rectangular cross-section. Strain gages 518 are placed on one or more sides 520 of the sensing tube 516. The sides may all have the same length in which case the cross-section of the sensing tube is a square. Alternatively, the sides may have different lengths, making the cross-section of the tube a non-square rectangle.

A tube with a rectangular cross-section is advantageous in that it produces larger strains as compared with a tube of a circular cross-section. This advantage comes from the fact that the rectangular cross-section tube deforms or expands in the longitudinal (or axial) direction as well as in the equivalent of a circumferential or latitudinal (or lateral) direction. This bulging in an extra direction makes for higher strains and therefore a higher gain signal output by the strain gages.

It will be appreciated that the deformation may be greater in a side having greater width. Therefore it may be advantageous to locate strain gages on a long side of a sensing tube with a non-square rectangular cross-section.

The sensing tube 516 may be mounted in housing flanges similar to those described above, with suitable modifications being made for the rectangular shape.

It will be appreciated that the features described above with regard to the circular cross-section sensing tube embodiments shown in FIGS. 15–19 may be employed with a rectangular cross-section sensing tube, with suitable modifications being made.

It will further be appreciated that sensing tubes with other cross-sectional shapes, for example that of a triangle or other polygon, may alternatively be employed.

Figure 23:
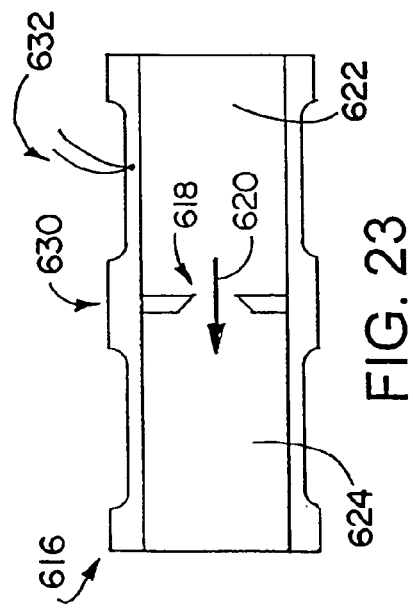
FIG. 23 is a sectional view of an alternate embodiment sensing tube which has a flow restriction therein for use as a flow meter.

A further additional embodiment is illustrated in FIG. 23, wherein a sensing tube 616 has a flow restriction such as an orifice 618 therein. The orifice 618 causes a pressure drop across along flow direction 620, such that the pressure in an upstream region 622 is greater than the pressure in an downstream region 624. It will be appreciated that the strains in the sensing tube 616 upstream of the orifice 618 will be different from the strains downstream of the orifice. It is to be expected, therefore, that strains downstream of the orifice will be different from strains upstream of the orifice. By locating strain gages on the sensing tube 616 both upstream and downstream of the orifice 618, the pressure drop across the orifice 618 may be determined. Since there is generally a known relationship between the pressure drop across the orifice 618 and the flow through the orifice 618, the sensing tube 616 may be used as a flow meter to calculate the flow therethrough.

The sensing tube 616 may have a thicker wall portion 630 in the region of the orifice 618 thereby to hinder interaction between the straining of the sensing tube upstream and downstream of the orifice 618.

The sensing tube 616 includes a temperature measuring device 632 to measure temperature in the fluid or in the sensing tube near the fluids. Exemplary temperature measuring devices include thermocouples and thermistors.

The flow restriction 618 is described above as an orifice. It will be appreciated alternatively other flow restrictions may be employed which cause a pressure drop which is dependant on the rate of flow therethrough.

Figure 24:
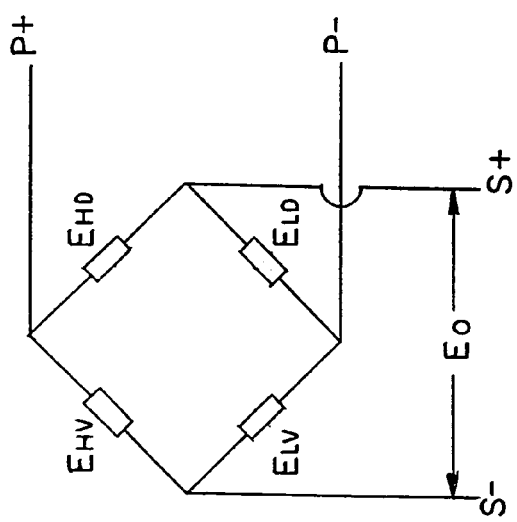
FIG. 24 is a schematic diagram of the electrical connections of the strain gages of the sensing tube of FIG. 23.

The strain gages of the sensing tube 616 may be wired in a Wheatstone Bridge to provide a direct measure the flow rate. Referring to FIG. 24, one possible wiring configuration is given, where $\epsilon_{HU}$ and $\epsilon_{LU}$ are the circumferential (hoop) and axial (longitudinal) strains, respectively, on the upstream side of the flow restrictions, and $\epsilon_{HD}$ and $\epsilon_{LD}$ are the circumferential and axial strains on the downstream side of the flow restriction. When so configured the output $\epsilon_0$ of the bridge is equal to $\epsilon_{HU}+\epsilon_{LD}-\epsilon_{HD}-\epsilon_{LU}$. The pressure drop across the flow restriction is a function of the output $\epsilon_0$. Since the flow rate is a function of the pressure drop across the flow restriction, the flow rate is a function of $\epsilon_0$.

The present invention has hitherto been described as involving a sensing tube which completely surrounds a fluid flow. The present invention also embraces embodiments where a portion or part of a tube deforms a relatively greater amount in response to internal pressure. For example, a rectangular cross section sensing tube may have one its sides, or a portion of that side, which has a thinner wall than the rest of the sensing tube, such that only that side or portion of a side deforms significantly in response to internal pressure. Strain gages mounted on that side or portion of a side may measure the deformation, and the measurements may be used to determine pressure.

Figure 25:
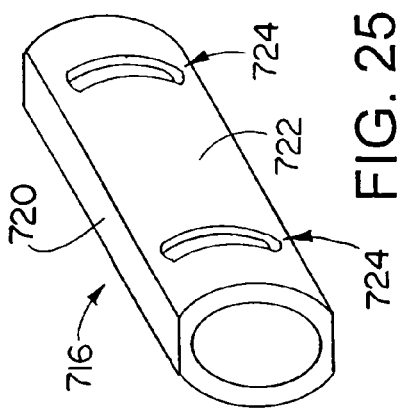
FIG. 25 is a perspective view of an alternate embodiment sensing tube with strain-enhancing regions.

Similarly, as shown in FIG. 25, a sensing tube 716 with a circular bore has a flat wall portion 720 which is thinner than the remainder 722 of the tube wall. Since the tube wall is thinner at the flat portion 720, the flat portion of the tube 716 will deform more than the remainder 722 of the tube wall.

Furthermore, it will understood that mechanisms may be employed for locally enhancing (amplifying) strain in the vicinity of a strain gage (increasing the sensitivity of the strain gage). For example, the sensing tube 716 has thinner portions such as channels or grooves 724. One or more of the strain gages placed on, adjacent to, or near such thinner portions may encounter larger strains than at the rest of the sensing tube.

Thinner portions for locally enhancing strain may enhance the strain for only one direction (axial or circumferential) or may enhance strain for both directions.

The invention has been described hitherto as involving strain gages mounted on the outside of a sensing tube. Alternatively, the strain gages may be mounted on the inside of a sensing tube in a suitable application, such as in measuring pressure in a flow of a non-corrosive, non-abrasive fluid.

It will be understood that other methods of measuring deformation and/or deflection of a sensing tube may be employed. For example, a piezoelectric material may be attached to a wall of a sensing tube to measure deformation of the tube.

Figure 26:
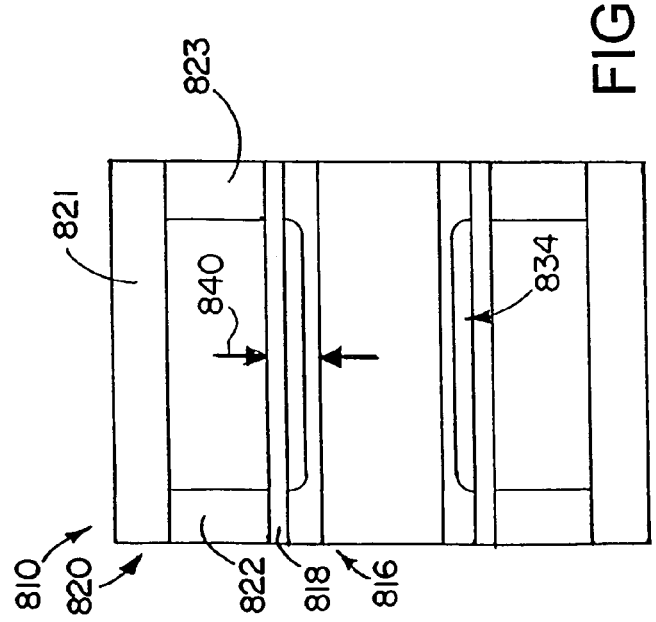
FIG. 26 is a sectional view of an alternate embodiment pressure transducer with a capacitance probe for measuring deflections in a sensing tube.

Referring to FIG. 26, an alternate embodiment pressure transducer 810 is shown which uses changes in capacitance to measure deflection of a sensing tube 816. The sensing tube 816 is surrounded by a close-fitting cylinder 818, which in turn is secured to a housing 820. The housing 820 a cover 821 which is attached to end flanges 822 and 823.

The transducer 810 includes a capacitance probe which measures capacitance between a central portion 834 of the tube 816, and the cylinder 818. The capacitance probe may measure capacitance between a pair of points, as indicated by the arrows 840 in FIG. 26. Alternatively, the capacitance probe may measure capacitance along a region between the central portion and the cylinder. A capacitor bridge may be used with the change in capacitance correlated to pressure within the tube. Suitable capacitance probes includes those marketed by Capacitec, Inc. of Massachusetts.

As the sensing tube 816 deforms because of internal pressure and the central portion 834 bows outward, the capacitance between the cylinder 818 and the central portion 834 decreases. Thus the capacitance probe may be used to determine the amount of deflection of the central portion 834. This measured deflection may be used to determine the pressure of the flow within the sensing tube.

The cylinder 818 also provides additional structural support for the housing 820. The additional support provided by the cylinder 818 may enable the cover 821 to be reduced in thickness. The effect may be an overall reduction in weight of the housing. It will be appreciated that this structural support benefit of an inner cylinder may be obtained with other embodiments of the inventions not utilizing capacitance probes. Such inner cylinders for structural support may be located at any of a variety of locations between the sensing tube and the cover.

The cylinder 818 may also mechanically isolate the sensing tube 816, rendering the sensing tube less susceptible to errors resulting from loads which might otherwise be transmitted from the housing to the sensing tube.

Figure 27:
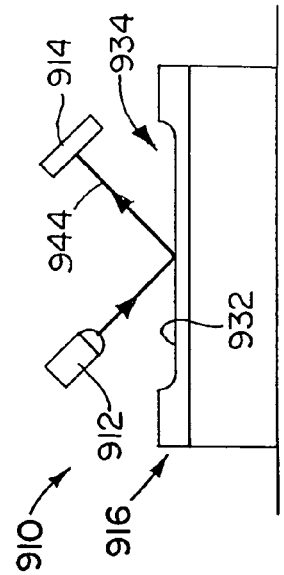
FIG. 27 is a sectional view of an alternate embodiment pressure transducer with an optical system for measuring deflections in a sensing tube.

FIG. 27 shows another alternate embodiment, a pressure transducer 910 which has a laser light source 912, a light detector 914, and a sensing tube 916. The light source 912 and the light detector 914 may be suitably mounted to housing, such as those described above, which encloses the sensing tube 916. The visible and/or non-visible light output from the light source 912 is directed-towards a reflective outer surface 932 of a central portion 934 of the sensing tube 916. The output reflects off the outer surface 932 and is received by the detector 140 as shown by light path 944. The light may be directed where the central portion undergoes maximum deflection in use, but the light may be directed elsewhere, if desired. As the central portion 934 deflects and deforms, the location at which the light from the light source 912 is incident on the detector 914 will vary. By configuring the light detector 914 such that the output therefrom varies as a function of where the light strikes the detector, an indication of the deformation of the sensing tube may be obtained. Exemplary light detectors include photodiode arrays and CCD arrays, with the output of the array varying as a function of the spatial location at which the light from the light source 912 is incident on the detector 914.

Although the pressure transducer 910 is described above in terms of detecting reflected light, it will be appreciated that the same principle may employed in a pressure transducer reflecting and detecting other types of continuum waves or electromagnetic energy, such as sound waves, radio waves, microwaves, or other sorts of radiation, by substituting suitable sources and detectors for the light source 912 and the light detector 914.

FIG. 28 shows yet another alternate embodiment, a pressure transducer 960 which has an optical displacement sensor 962 for detecting displacement of the sensing tube 966. The optical displacement sensor 962 may include a bundle of optical fibers. On some of the fiber strands, light is emitted and on other of the fiber strands, reflected light is received. The bundle of fibers is substantially perpendicular to the deflecting surface of the sensing tube 966. Deflection is measured by the amount of light from the emitting fibers that reflect back into the receiving fibers. The amount of light received by the receiving fibers is a function of the distance between the optical displacement sensor 962 and the sensing tube 966. Suitable fiber bundle optical displacement sensors include those marketed by Philtec, Inc. of Annapolis, Md.

Thus the embodiments described above involve a variety of sensors, such as strain gages, piezoelectric devices, capacitance probes, optical devices, or continuum wave detectors, for measuring deformation and/or deflection of a sensing tube.

Referring to FIG. 29, yet another embodiment, a sensing tube 1016, is shown. The sensing tube 1016 includes short, wide strain gages 1020 for measuring axial strain and long, narrow strain gages 1030 for measuring circumferential strain. The gages 1020 and 1030 encompass a sizable portion, approximately half, of the perimeter of the sensing tube 1016.

By encompassing a sizable portion of the perimeter, the error due to any local nonuniformity in the area of the sensing tube covered by the gages (e.g., a nonuniformity in wall thickness) will be reduced. This is because the strain in the area with the nonuniformity will be "averaged" with many other areas that do not have the nonuniformity.

It will be appreciated that the gages may be such so as to encompass substantially all of the perimeter of the sensing tube, if desired.

It will be appreciated that the sensing elements described above may be made from a hardened material to resist wear, for example from an abrasive slurry. Alternatively, a suitable energy-absorbing liner may be used to resist wear. Shown in FIG. 30 is a sensor 1060 which includes a sensing tube 1066 and a liner 1070. The liner may be made of an energy-absorbing material, for example rubber. The liner 1070 either may be either attached to the sensing tube 1066 or may be an insert placed within the sensing tube. An exemplary liner material for a specific application is natural latex rubber with a Shore "A" hardness of 40, a rubber content of 90% or greater, a specific gravity of 1.0 or less, and a tensile strength of 3000 psi. It will be appreciated that other suitable materials, for example natural gum rubber, may alternatively be used. It will further be appreciated that the liner material may be selected based on compatibility with the fluid flowing through the sensing element. The thickness of the liner may be selected based on the size of particles in the fluid, for example on the size of abrasive particles in a slurry. The liner thickness may be selected to absorb the energy of impacting particles and deflect the particles back into the flow field.

FIG. 31 shows a measurement device 1100 which allows direct measurement of dynamic flow rates and pressures of fluids such as gasses, liquids, slurries, and the like, without the use of any probe or other obstruction in the flow. The measurement device 1100 includes a central body 1114 having a flow passage therethrough, the body including a shaped conduit 1116 and conduit extensions 1118 and 1120 coupled to the shaped conduit at opposite, respective ends. The inlet for the flow passage through the central body 1116 is in a different direction from the outlet for the flow passage.

A sensing element 1122 and a flexible coupling 1124 are attached to respective opposite end of the central body. The sensing element 1122 has strain gages 1132, 1134, 1136, and 1138 thereupon for measuring deformations due to pressure and/or flow within the measuring device 1100. The sensing element 1122 may be similar to one or more of the various sensing tubes described above. A flexible seal or enclosure 1140 may be provided around the straining element 1122 as a pressure-containment. An exemplary flexible seal is a metal bellows.

The flexible coupling 1124, as explained below, is able to increase its length along the flow direction in order to concentrate strains in the sensing element 1122 which arise due to the force on the central body 1116 as a result of the change in fluid flow direction through the central body. The flexible coupling 1124 may be, for example, a bellows such as a length of corrugated pipe, or a fiber-reinforced hose.

The sensing element 1122 and the flexible coupling 1124 may have suitable couplings at respective inlet and outlet ends 1142 and 1144 of the device 1100, for coupling the device to a pipeline for carrying flowing fluid, for example. It will be appreciated that a wide variety of suitable attachment mechanisms may be employed, for example bolted flanges, threaded fittings, or frangible fittings. A structural element such a channel 1146 is attached to both of the ends 1142 and 1144, on opposite sides of the central body 1116, outboard of (farther from the central body than) the sensing element 1122 and the flexible coupling 1124. The channel 1146 has support points such as eyelets 1150 for mounting or otherwise securing the measuring device 1100 to an external structure or fixed object, for example. The channel 1146 carries loads external to the flow measuring device 1100, thus preventing these external loads from affecting the strain in the sensing device 1122.

As a fluid flow passes through the central body 1116, the fluid flow changes direction and thus momentum. A force on the fluid is required to be exerted on the fluid to effect this change in momentum. The force on the fluid produces a reaction force 1154 on the central body 1116 which is equal in magnitude and opposite in direction. The magnitude of the reaction force 1154 is a function of the mass flow rate of the fluid, among other factors.

Since the measurement device 1100 is securely mounted to an external structure, the reaction force 1154 causes appreciable deflection only within the channel 1146. The flexible coupling 1124 provides relatively little resistance, when compared with the sensing element 1122, to movement of the central body 1116 by the reaction force 1154. Therefore, as shown in FIG. 31, the sensing element 1122 essentially becomes part of a cantilevered beam, and undergoes strain as a result of the movement of the central body 1116 by the reactive force. This strain is at its greatest on the sensing element 1122 farthest from the sensing device's neutral plane of bending 1158. Therefore, a first set of strain gages 1160, including the strain gages 1132 and 1134, those farthest from the neutral plane of bending 1158, are the gages used in measuring strains caused by the reaction force 1154. A second set of strain gages 1162, the strain gages 1136 and 1138, those along the neutral plane of bending 1158, may be used in measuring pressure within the sensing element, in a manner similar to that described above with regard to other embodiments.

It will be appreciated that output from the sensing element 1122 may be suitably calibrated to allow the readings from the first set of strain gages 1160 to be converted into flow rates. It will be further appreciated that lengths of the conduit extensions 1118 and 1120 may be adjusted in order to adjust the output signal from the sensing element 1122.

A wide variety of variations of the above-described design may be employed. For example, the central body 1116 shown in FIG. 31 is a single bend covering substantially 90°. However, the direction change may alternatively include multiple bends, or even a sharp corner, if desired. In addition, the total change of direction may be other than a right angle. For example, a measurement device 1200 (FIG. 32) includes a central body 1216 between a sensing element 1222 and a flexible coupling 1224, the central body substantially reversing the flow direction, making a substantially 180° bend. The measurement device 1200 includes a straight structural element 1246 directly coupling ends 1242 and 1244 of the measurement device. The structural element may be a bar, beam, rod, or the like, and may be a single, solid piece. It will appreciated that alternatively the structural element 1246 may be differently shaped or may be made of multiple pieces, if desired.

In another variation, a measurement device 1300 (FIG. 33) includes a central body 1316 between an sensing element 1322 and a flexible coupling 1324, the central body having a total amount of bend that is neither 90° nor 180°. A structural element such as the ones described above may used with the measurement device 1300. Alternatively, the desired effect of concentrating the strains due to a reaction force 1354 at a sensing element 1322 may be accomplished by clamping or otherwise securing inlet and outlet pipes 1366 and 1368 which coupled to the measurement device 1300.

Referring now to FIG. 34, an in-line measurement device 1400 is shown which has a central body 1416 between a sensing element 1422 and a flexible coupling 1424. The measurement device 1400 is suitable for measuring flow in a break between substantially-parallel inlet and outlet pipes 1466 and 1468. Elbows 1470 and 1472 turn the flow coming into and exiting out of the measurement device 1400. A structural element 1446 is attached inboard of the elbows 1470 and 1472, although alternatively it may be attached outboard of the elbows.

The measurement devices shown in FIGS. 31–34 and described above may be enclosed in suitable housings, if desired. It will be appreciated that the devices may be coupled to suitable external components for acquiring, processing, storing, and/or displaying flow rate and/or pressure information. The measurement devices described may generally be placed in either direction in the flow, i.e., with the sensing element either upstream or downstream of the central body.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A pressure transducer for measuring pressure in a pipeline, the transducer comprising:

a sensing tube allowing flow therethrough, wherein the sensing tube has a substantially uniform cross-section for maintaining substantially unobstructed continuous flow through the pipeline and the sensing tube, when coupled to the pipeline, and wherein at least a portion of the sensing tube mechanically deforms by local bulging in response to a pressure on one side thereof;

at least one means for measuring deformation on the sensing tube for measuring deformation of the at least a portion of the sensing tube; and a housing at least partially surrounding the sensing tube.

2. The pressure transducer of claim 1, wherein the sensing tube has a perimeter, and the at least a portion of the sensing tube extends fully around the perimeter.

3. The pressure transducer of claim 1, wherein the tube has a perimeter, and the at least a portion of the sensing tube does not extend fully around the perimeter.

4. The pressure transducer of claim 1, wherein the sensing tube has a circular cross section.

5. The pressure transducer of claim 4, further comprising a pipe flange for connecting a pipe to the sensing tube, wherein an inner diameter of the pipe flange and an inner diameter of the sensing tube are substantially identical.

6. The pressure transducer of claim 5, wherein the pipe flange has threads thereupon to mate with threads on a pipe segment which has an inner diameter which is substantially identical to the inner diameter of the pipe flange.

7. The pressure transducer of claim 1, wherein the sensing tube has a rectangular cross section.

8. The pressure transducer of claim 1, wherein the sensing tube has a square cross section.

9. The pressure transducer of claim 1,
wherein the at least one means for measuring deformation includes at least one strain gage is on a second side of the at least a portion of the sensing tube;
wherein the second side and the one surface are on opposite major surfaces of the at least a portion.

10. The pressure transducer of claim 1, wherein the housing encircles the sensing tube.

11. The pressure transducer of claim 10, wherein the housing includes a cover and a pair of pipe connectors for coupling the housing-to-pipe segments.

12. The pressure transducer of claim 11, wherein the cover is cylindrical.

13. The pressure transducer of claim 11, wherein the housing further includes a cylinder between the sensing tube and the cover.

14. The pressure transducer of claim 11, wherein the cover includes one or more access doors.

15. The pressure transducer of claim 14, wherein at least one of the access doors has an electrical connector therein.

16. The pressure transducer of claim 11, wherein the cover has open ends, each of the open ends having a housing flange attached thereto.

17. The pressure transducer of claim 10, wherein the sensing tube is attached to the housing.

18. The pressure transducer of claim 17, wherein the sensing tube includes an end portion which is attached to the housing and a central portion to which the at least one means for measuring deformation strain gage is mounted.

19. The pressure transducer of claim 18, wherein the end portion has a thicker wall than the central portion.

20. The pressure transducer of claim 19, wherein the sensing tube further includes a curved portion linking the end portion and the central portion.

21. The pressure transducer of claim 20, wherein the curved portion has a constant radius of curvature.

22. The pressure transducer of claim 20, wherein the curved portion is tapered, having a radius of curvature which increases closer to the thinner portion.

23. The pressure transducer of claim 20, wherein at least one of the at least one means for measuring deformation strain gage is located adjacent to the curved portion.

24. The pressure transducer of claim 20,
wherein the at least one means for measuring deformation includes:
first strain gages for measuring axial strains; and
second strain gages for measuring circumferential strains; and
wherein the first strain gages are located adjacent to the curved portion of the sensing tube.

25. The pressure transducer of claim 24, wherein the second strain gages are located on the sensing tube closer than the first strain gages to a middle of the sensing tube.

26. The pressure transducer of claim 24, wherein the first strain gages and the second strain gages are coupled together in a Wheatstone bridge.

27. The pressure transducer of claim 19, wherein the end portion includes a connecting member which is attached to the housing and a rib which is mechanically isolated from the housing.

28. The pressure transducer of claim 27, wherein the connecting member is mechanically isolated from the rib by a groove between the connecting member and the rib.

29. The pressure transducer of claim 28, wherein one end of the sensing tube is attached to the housing and another end of the sensing tube is slidably mounted in the housing.

30. The pressure transducer of claim 29, wherein the one end is welded or mechanically attached to the housing and the another end is mounted to the housing with a flexible seal therebetween.

31. The pressure transducer of claim 19, wherein the sensing tube includes a second end portion, the end portions having different outside diameters.

32. The pressure transducer of claim 1, wherein the sensing tube is made of metal.

33. The pressure transducer of claim 1, wherein the at least a portion of the sensing tube includes a thinner portion which amplifies the changes in shape.

34. The pressure transducer of claim 1, wherein the at least one means for measuring deformation includes at least one strain gage.

35. The pressure transducer of claim 34, wherein the at least one strain gage includes at least two strain gages, one of the at least two gages used for measuring axial strain and another of the at least two gages used for measuring circumferential strain.

36. The pressure transducer of claim 34, wherein the at least one strain gage includes at least four strain gages, at least two of the gages used for measuring axial strain and another at least two of the gages used for measuring circumferential strain.

37. The pressure transducer of claim 36, wherein the at least two of the gages used for measuring axial strain and the another at least two of the gages used for measuring circumferential strain are connected together in a Wheatstone bridge.

38. The pressure transducer of claim 1, wherein the sensing tube is mechanically constrained at opposite axial ends of the sensing tube.

39. The pressure transducer of claim 38, wherein the sensing tube is mechanically constrained by respective pipe couplings at the opposite axial ends.

40. A pressure transducer for measuring pressure in a pipeline, the transducer comprising:
a sensing tube allowing flow therethrough, wherein the sensing tube has a substantially uniform cross-section for maintaining substantially unobstructed continuous flow through the pipeline and the sensing tube, when coupled to the pipeline, and wherein at least a portion of the sensing tube changes shape by local bulging in response to a pressure on one side thereof;

a sensor for measuring the changes in shape of the at least a portion of the sensing tube; and a housing at least partially surrounding the sensing tube.

41. The pressure transducer of claim 36, wherein the sensor includes a means for measuring the changes in shape of the at least a portion of the sensing tube.

42. The pressure transducer of claim 36, wherein the sensor includes at least one strain gage mounted on the sensing tube for measuring deformation of the at least a portion of the sensing tube.

43. The pressure transducer of claim 40, wherein the sensor includes at least one piezoelectric device for measuring deformation of the at least a portion of the sensing tube.

44. The pressure transducer of claim 40, wherein the sensor includes a light source and a light detector for measuring deflection of the at least a portion of the sensing tube.

45. The pressure transducer of claim 40, wherein the sensor includes a capacitance probe for measuring deflection of the at least a portion of the sensing tube.

46. The pressure transducer of claim 40, wherein the sensor includes a continuum wave source and a continuum wave detector for measuring deflection of the at least a portion of the sensing tube.

47. The pressure transducer of claim 40, wherein the sensing tube is made of a generally rigid material.

48. The pressure transducer of claim 47, wherein the generally rigid material is a metal.

49. The pressure transducer of claim 40, wherein the housing surrounds the sensing tube and the sensor.

50. The pressure transducer of claim 40, wherein the sensing tube is mechanically constrained at opposite axial ends of the sensing tube.

51. The pressure transducer of claim 50, wherein the sensing tube is mechanically constrained by respective pipe couplings at the opposite axial ends.

52. A method of measuring fluid pressure in a pipeline, comprising:

at least partially enclosing in a housing a sensing tube which includes a flow passage therethrough;

installing the sensing tube in line with the pipeline, such that substantially unobstructed flow is provided from the pipeline, through the flow passage of the sensing tube, and back into the pipeline; and measuring strain in the sensing tube due to local bulging of the sensing tube caused by fluid pressure in the flow passage, as a representation of the fluid pressure.

53. The method of claim 52, wherein the measuring strain includes measuring strain with one or more strain gages placed on an outer surface of the sensing tube.

54. The method of claim 52, further comprising placing the strain gages in a bridge configuration to increase an output signal.

55. The method of claim 52, wherein the sensing tube and the strain gages are fully enclosed in a housing.

56. The method of claim 55, further comprising structurally isolating at least a portion of the sensing tube from the housing.

57. The method of claim 55, further comprising placing the strain gages on portions of the sensing tube which have a maximum strain response.

58. The method of claim 52, wherein the measuring strain includes measuring both axial and circumferential strains.

59. A pressure transducer for measuring pressure in a pipeline, the transducer comprising:

a sensing tube allowing flow therethrough, wherein the sensing tube has a substantially uniform cross-section for maintaining substantially unobstructed continuous flow through the pipeline and the sensing tube, when coupled to the pipeline, and wherein at least a portion of the sensing tube mechanically deforms by local bulging in response to a pressure on one side thereof; and at least four strain gages on the sensing tube for measuring deformation of the at least a portion of the sensing tube; and wherein at least two of the strain gages are configured for measuring axial strain and another at least two of the gages are configured for measuring circumferential strain; and wherein the at least two of the gages used for measuring axial strain and the another at least two of the gages used for measuring circumferential strain are connected together in a Wheatstone bridge.

60. The pressure transducer of claim 59, further comprising a housing at least partially surrounding the sensing tube.

61. The pressure transducer of claim 60, wherein the housing encircles the sensing tube.

62. The pressure transducer of claim 61, wherein the sensing tube is attached to the housing.

63. The pressure transducer of claim 62, wherein the sensing tube includes an end portion which is attached to the housing and a central portion to which the at least four strain gages are gage is mounted.

64. The pressure transducer of claim 63, wherein the end portion has a thicker wall than the central portion.

65. The pressure transducer of claim 64, wherein the sensing tube further includes a curved portion linking the end portion and the central portion.

66. The pressure transducer of claim 65, wherein the curved portion has a constant radius of curvature.

67. The pressure transducer of claim 65, wherein at least one of the at least four strain gages is located adjacent to the curved portion.

\* \* \* \* \*